(12) United States Patent
Fukuda

(10) Patent No.: US 9,126,472 B2
(45) Date of Patent: Sep. 8, 2015

(54) DOOR WEATHERSTRIP

(71) Applicant: NISHIKAWA RUBBER CO., LTD., Hiroshima-shi, Hiroshima (JP)

(72) Inventor: Kazuaki Fukuda, Hiroshima (JP)

(73) Assignee: NISHIKAWA RUBBER CO., LTD., Hiroshima-shi, Hiroshima (JP)

( * ) Notice: Subject to any disclaimer, the term of this patent is extended or adjusted under 35 U.S.C. 154(b) by 0 days.

(21) Appl. No.: 13/644,954

(22) Filed: Oct. 4, 2012

(65) Prior Publication Data

US 2013/0097936 A1 Apr. 25, 2013

(30) Foreign Application Priority Data

Oct. 21, 2011 (JP) .................. 2011-231998

(51) Int. Cl.
*E06B 7/16* (2006.01)
*B60J 5/10* (2006.01)
*B60J 10/08* (2006.01)

(52) U.S. Cl.
CPC ................ *B60J 5/105* (2013.01); *B60J 10/085* (2013.01)

(58) Field of Classification Search
USPC ............ 49/475.1, 476.1, 479.1, 480.1, 483.1, 49/484.1; 277/644, 648, 649
See application file for complete search history.

(56) References Cited

U.S. PATENT DOCUMENTS

| | | | | |
|---|---|---|---|---|
| 5,136,814 A * | 8/1992 | Headrick | ......................... | 49/468 |
| 5,179,804 A * | 1/1993 | Young | ............................. | 49/471 |
| 5,214,879 A * | 6/1993 | Nozaki | ......................... | 49/475.1 |
| 5,493,814 A * | 2/1996 | Christian | ..................... | 49/479.1 |
| 5,618,608 A * | 4/1997 | Teishi | ............................. | 428/122 |
| 5,655,333 A * | 8/1997 | Yamashita | ....................... | 49/441 |
| 6,386,619 B1 * | 5/2002 | Tsuchida | ................... | 296/146.9 |
| 6,499,257 B1 * | 12/2002 | Tsuchida et al. | ............. | 49/495.1 |
| 6,601,346 B2 * | 8/2003 | Nozaki | ......................... | 49/498.1 |
| 8,181,397 B2 * | 5/2012 | Daio et al. | ..................... | 49/492.1 |
| 2005/0194751 A1 * | 9/2005 | Fukushima | ................... | 277/644 |
| 2011/0099911 A1 * | 5/2011 | Ellis et al. | ..................... | 49/493.1 |
| 2012/0079771 A1 * | 4/2012 | Meulemans | ................. | 49/484.1 |
| 2012/0159858 A1 * | 6/2012 | Mori et al. | .................... | 49/476.1 |

FOREIGN PATENT DOCUMENTS

JP 62-166128 10/1987

\* cited by examiner

*Primary Examiner* — Katherine Mitchell
*Assistant Examiner* — Shiref Mekhaeil
(74) *Attorney, Agent, or Firm* — Flynn, Thiel, Boutell & Tanis, P.C.

(57) ABSTRACT

A door weatherstrip for a vehicle includes an extrusion part, which is mounted by insertion onto a flange 25 formed on the vertical side edge of a first-closing door 3 among double doors 3 and 4, and a molded part 51, which is integrally formed on the upper end of the extrusion part and seals between the first-closing door 3 and a next-closing door 4 when the doors 3 and 4 are closed. A molded part 51 has a wider part 31a including a deep insertion groove 29, and a slit 52 is formed in the door width direction from the side end on the sidewall 31, and water that has invaded through between the flange 25 and the molded part 51 flows out onto a drip channel 8 established on the upper edge of the door opening of the body via the slit 52.

6 Claims, 11 Drawing Sheets

DOOR WEATHERSTRIP

FIELD OF THE INVENTION

The present invention relates to a door weatherstrip that is mounted to either one of two double doors in order to seal around a door in a vehicle including double doors. Furthermore, the vertical direction in the present specification means a direction relative to a vehicle, and the horizontal direction means a direction in the case of viewing the rear part of the vehicle from the rear side of the vehicle.

BACKGROUND OF THE INVENTION

FIG. 1 shows a vehicle including double rear doors, and the illustrated rear doors include a right door 3 that is turnably connected to the right edge of a door opening edge 1 formed on the rear surface of the vehicle body by hinges 2, and that opens/closes the right section of the door opening edge 1, and a left door 4 that is turnably connected to the left edge of the door opening edge 1 similarly by the hinges 2, and that opens/closes the left section of the door opening edge 1, and when closing the doors, after either the right door 3 or the left door 4 is closed first, the other door is closed.

In the doors 3 and 4, in general, their upper edges are formed by bending toward the vehicle interior side, and in order to seal between the upper edge of the door opening edge of the vehicle body and the doors 3 and 4 when closing the doors, a body weatherstrip and a main weatherstrip are mounted to the upper edge of the door opening edge shown with 'a' part in FIG. 1, and in order to seal between the closed right door 3 and left door 4, another door weatherstrip is mounted to the vertical edge of either the first-closing door 3 or door 4. Hereafter, these weatherstrips are explained in sequence.

The body weatherstrip 6, as shown in FIG. 2, which is a cross-sectional view on the E-E line in FIG. 1, is composed of a mounting base 11 that is mounted by insertion into a flange 9, which is mounted in a sidewall 8a of a drip channel 8 that is formed by protruding toward the outside of the vehicle from a body panel 7 on the upper edge of the door opening edge, and that forms roughly a U-shaped lateral cross section, and a hollow seal 13 that protrudes upward from the mounting base 11, and where a flange 12 on the upper door end protruding toward the vehicle interior side of the door upper edge elastically makes contact when closing the doors 3 and 4, and main weatherstrip 15 is composed of a mounting base 16 with a roughly-U-shaped cross section that is mounted by insertion into a flange 8b on the drip channel end, which is formed by protruding outward obliquely, and a hollow seal 17 that obliquely provides a protrusion outward from the mounting base 16, and that elastically makes contact with the doors 3 and 4 when closing the doors, and the body weatherstrip 6 and the main weatherstrip 15 form a double seal structure to seal between the door upper edge and the upper edge of the door opening edge of the vehicle body.

A door weatherstrip 21 is composed of an extrusion part and molded parts that are integrally formed with the extrusion part on the upper and lower ends, and in FIGS. 3 to 8, among them, in an illustrated example showing an upper end of the extrusion part 22 and a molded part 23 that is integrally formed with the upper end of the extrusion part 22, and that seals the upper end of the aligned portion of both doors 3 and 4, which is represented by the 'a' part in FIG. 1, the door weatherstrip 21 is mounted to the right door 3 of the right door 3 and the left door 4.

The extrusion part 22 constituting the door weatherstrip 21, as shown in FIG. 6, is composed of a mounting base 26 having a cored bar with a lateral roughly-U-shaped cross section mounted by insertion into a flange 25, which is formed with a joint part where the edges of an inner panel 3a and an outer panel 3b constituting the right door 3 overlap, and a hollow seal 27 that protrudes toward the outside of the vehicle from the mounting base 26, and if the left door 4 is closed after the right door 3 is closed, it is designed such that the periphery of the side edge of the left door 4 on the vehicle interior side elastically makes contact with the hollow seal 27.

Next, the molded part 23 is explained based upon FIG. 3 to FIG. 9. Herein, FIG. 3 is a perspective view showing the overall structure of the molded part 23 that is integrally formed in the extrusion part 22; FIG. 4 is a perspective view of the molded part 23 of the door weatherstrip 21 mounted to the right door 3 viewing from the outside of the vehicle; FIG. 5 is a front view of the molded part 23 similarly mounted to the right door 3 viewing from the vehicle interior; FIG. 6 is an enlarged cross-sectional view of the line B-B of FIG. 5; FIG. 7 is a cross-sectional view of the line C-C of FIG. 5; and FIG. 8 is a perspective view of the right door corner portion where the molded part 23 is mounted. In the drawings showing the door weatherstrip 21, the triangle mark indicates that the side of a filled portion with black color is a molded part and the side of an unfilled portion is an extrusion part.

The molded part 23, similar to the mounting base 26 of the extrusion part 22, has an insertion groove 29 (see FIG. 7) where the flange 25 is inserted, and the sidewall 31 on the vehicle interior side forming the insertion groove 29 is formed on the extension of the interior side sidewall of the mounting base 26. Then, a wider part 31a forming a wider step from the vicinity of the extrusion part 22 to the end is formed, and the wider part 31a, as shown in FIG. 2, bends along the bend of the flange 25, which bends upward, and has a roughly-lateral transverse part $31a_1$ having thickness and a vertical longitudinal part $31a_2$, and after the molded part 23 is mounted to the inner panel 3a of the right door 3, the transverse part $31a_1$ is fixed to the inner panel 3a of the right door 3 on the side end of the transverse part $31a_1$ with a clip 33 (see FIG. 5).

The corner portion of the right door 3 where the molded part 23 is mounted, as shown in FIG. 8, includes the flange 25 and a step 35 that is formed by protruding toward the vehicle exterior continuously from the flange 25, and the step 35 is gradually diminished toward the end, and the step 35 is eliminated on the end and flange 25 is formed to be wider. The sidewall 36 of the molded part 23 on the vehicle exterior side forming the insertion groove 29 corresponding to the width of the flange 25 becomes wider on the end portion. Then, a step-state cover part 37 that is integrated with the sidewall 36 as shown in FIG. 4, and that covers the step 35 is established in the lower side part of the molded part 23.

The lower side part of the molded part 23 also includes a hollow part 38 established continuously from the hollow seal 27 of the extrusion part 22, and the closer the hollow part 38 comes to the end, the smaller its cross section gradually becomes, ultimately being eliminated in the end. Then, the sidewall 36 from the vicinity of the section corresponding to the wider part 31a to the end becomes thicker, and includes the hollow part 36a (see FIG. 7).

The molded part 23 is roughly at right angles to the longitudinal part $31a_2$ of the wider part 31a and is allocated to the flange 12 from the vehicle interior side, and the side surface on the vehicle exterior side includes a fin 39 that is flush with the side surface of the sidewall 36 on the vehicle exterior side, and an un-shown flange of the left door 4 is designed to cover the fin 39 and the side surface of the sidewall 36 on the vehicle exterior side when the left door 4 is closed. The fin 39 also includes a cover 41 at its side end, and the fin 39 is designed to be supported by the flange 12 by covering the side end of the flange 12 with the cover 41 (see FIG. 4).

In the state of FIG. 2 where the molded part 23 with the construction above is mounted to the right door 3, when rain water or the wash water of a car wash passes through between an end of the flange 12 and the hollow seal 13 of the body weatherstrip 6 and invades between the sidewall 31 of the molded part 23 on the vehicle interior side and the flange 12, the water invades as shown by the dotted arrow in FIG. 2 and FIG. 5, respectively, and then invades the vehicle interior from the wider part 31a of the molded part 23.

If the cover 41 that covers the flange 12 expands in the direction of the arrow in FIG. 4 and is formed to be wider, the expanded portion will be able to prevent the water from invading through between the flange 12 and the sidewall 31. However, since the cover 41 is exposed to the right door, the wider the covering 41 becomes, the more the appearance is impaired, which is not preferable.

In Japanese Utility Model Application Laid-Open No. S62-166128, in a seal structure where a body weatherstrip is mounted to the vehicle exterior sidewall of the drip channel, which is formed on the upper edge of the door opening on the vehicle body side to be closed and opened by the rear doors, and when a right door and a left door of double doors are closed, the flange of the left door elastically makes contact with a seal surface of the weatherstrip on the vehicle body side, and a seal material mounted to the right door elastically makes contact with the seal surface of the weatherstrip on the vehicle body side, in order to prevent water from invading the vehicle interior through the clearance surrounded by the seal surface of the body weatherstrip, the flange end surface of the left door and the seal material mounted to the right door, a drainage hole is formed in the body weatherstrip and water that may have invaded into the clearance is designed to flow out onto the drip channel through the drainage hole.

SUMMARY OF THE INVENTION

The above mentioned seal structure prevents water from invading through the clearance surrounded by the body weatherstrip mounted to the vehicle body, the flange end surface of a first-closing door, which is closed first when the double doors are closed, and the sealing material to be mounted to the other door; on the other hand, the present invention includes an extrusion part that is mounted on the side edge of the door, which is closed first among the doors constituting the double doors, and the molded part that is integrally formed on the upper end of the extrusion part, and targets the door weatherstrip to seal between the first-closing door and the next-closing door closed thereafter, and prevents water from invading through between the first-closing door and the door weatherstrip mounted to the door in the vehicle interior.

In the weatherstrip including the insertion groove into the flange, in order to have sealing properties, a sealer is poured therein and the flange end is inserted into the sealer. However, when attempting to pour the sealer into the bottom of the insertion groove, if the depth of the groove 29 is great like the insertion groove 29 on the wider portion shown in FIG. 7, a nozzle for sealer insertion does not reach the depth of the insertion groove 29, and it becomes difficult to pour the sealer. If the nozzle is extended in order to pour the sealer deeply in the insertion groove 29, the rigidity of the nozzle itself is impaired and it becomes easily broken in the middle. The symbol 30 shown in FIG. 7 is the sealer to be poured into the bottom of the insertion groove 29.

The objective of the present invention is to provide a door weatherstrip for a vehicle that prevents water from invading through between the first-closing door and the door weatherstrip mounted by insertion onto the flange of the door, and, where the sealer can be easily poured into the groove even if the insertion groove where the flange is inserted is deep.

The present invention relates to a door weatherstrip for a vehicle that includes an extrusion part that is mounted by insertion into a flange formed on the vertical side edge of a first-closing door out of doors constituting double doors, and a molded part that is integrally formed on the upper end of the extrusion part, and that seals between the first-closing door and a next-closing door when the doors are closed, and in the door weatherstrip for a vehicle having a wider part including a deep insertion groove to the flange, among both sidewalls of the wider part forming the deep insertion groove, a slit for water drainage that is cut in the door width direction from the side end of the sidewall, and where one end is opened, and water that has invaded through between the flange and the molded part flows out onto a drip channel established on the upper edge of the door opening of the body via the slit for water drainage.

Other features and effects of the present invention will be more clearly understood in the following detailed description of the embodiments by those skilled in the art. It must be, however, noted thon the technical scope of the present invention is not limited to the embodiments and the accompanying drawings alone.

DESCRIPTION OF THE PREFERRED EMBODIMENT

Figure 1:
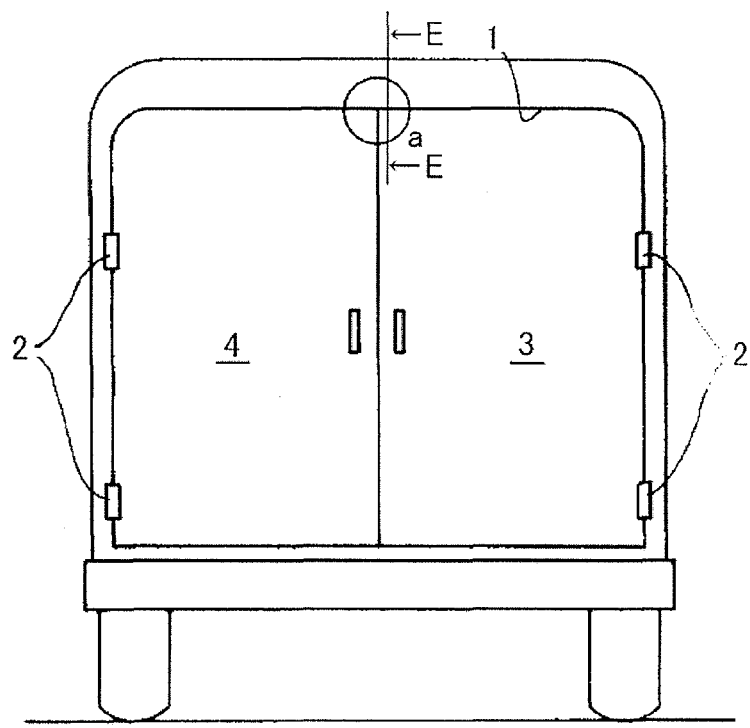
FIG. 1 is front view of a rear door in a vehicle.

Hereafter, the door weatherstrip in embodiments of the present invention is explained with reference to the drawings. In the drawings, the same symbols are marked in the same structural parts shown in FIG. 1 to FIG. 8, and the explanation is omitted.

Figure 3:
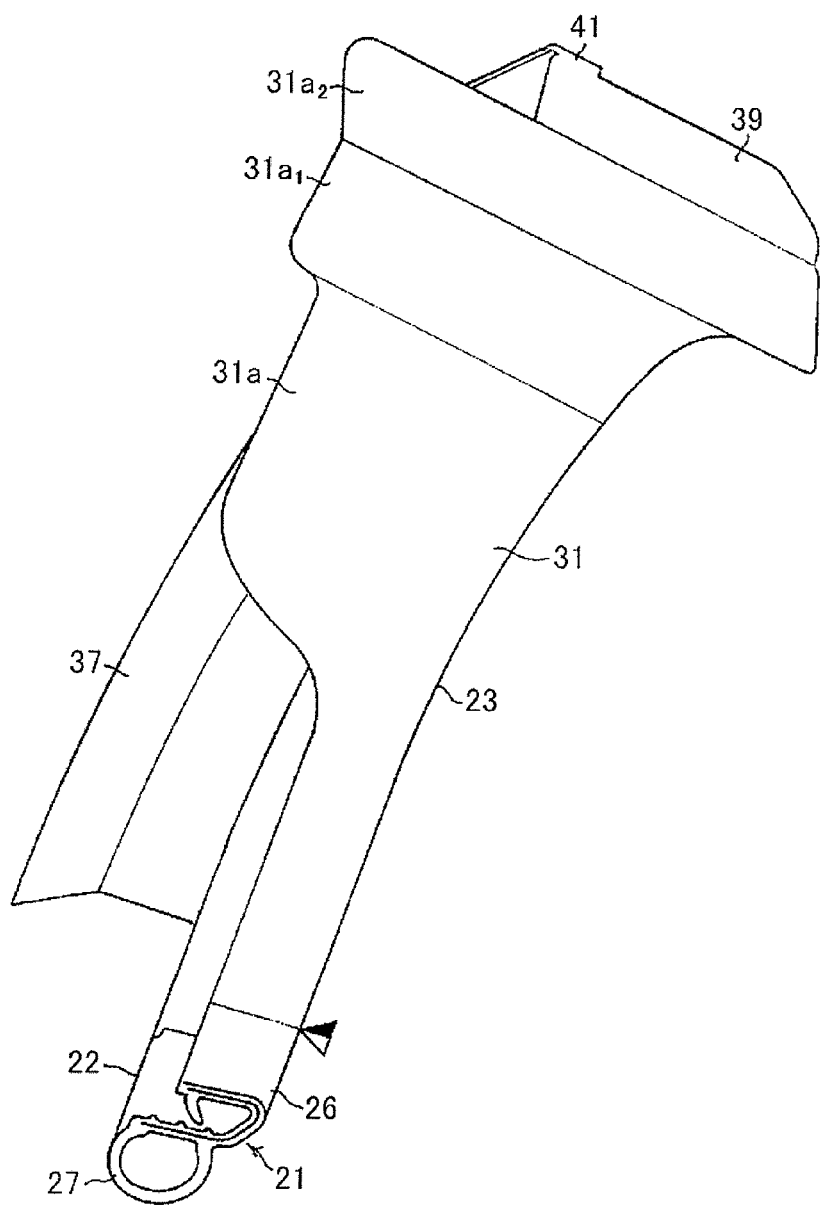
FIG. 3 is a perspective view of the molded part in the door weatherstrip.
Figure 4:
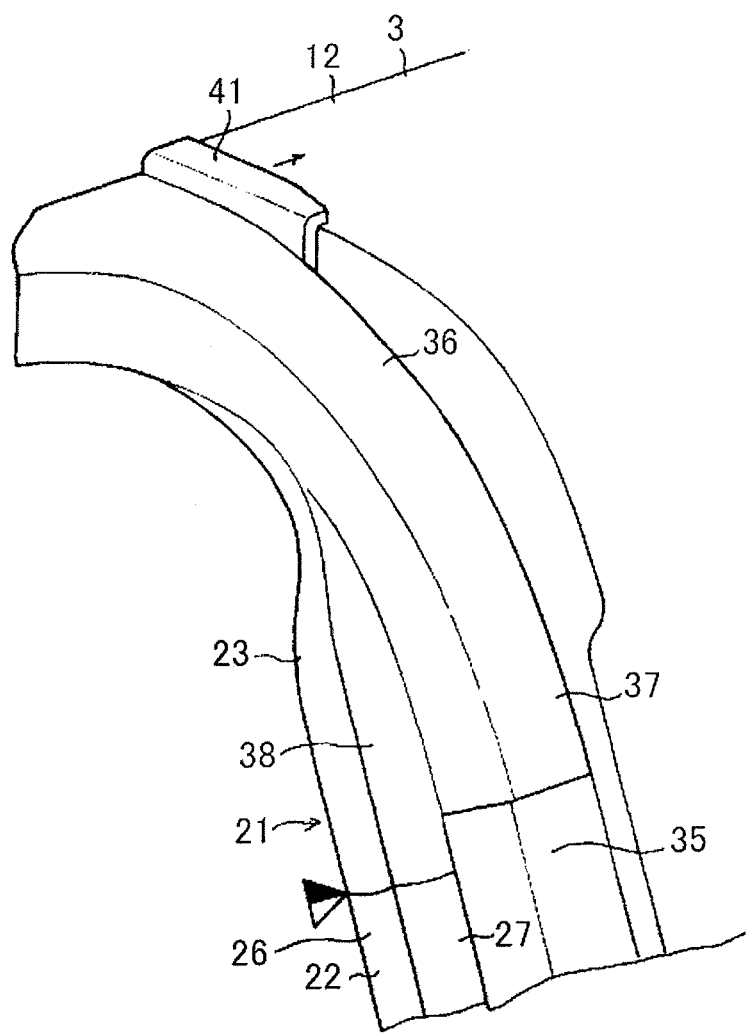
FIG. 4 is a perspective view where the molded part shown in FIG. 3 is mounted to the corner of a first-closing door.
Figure 5:
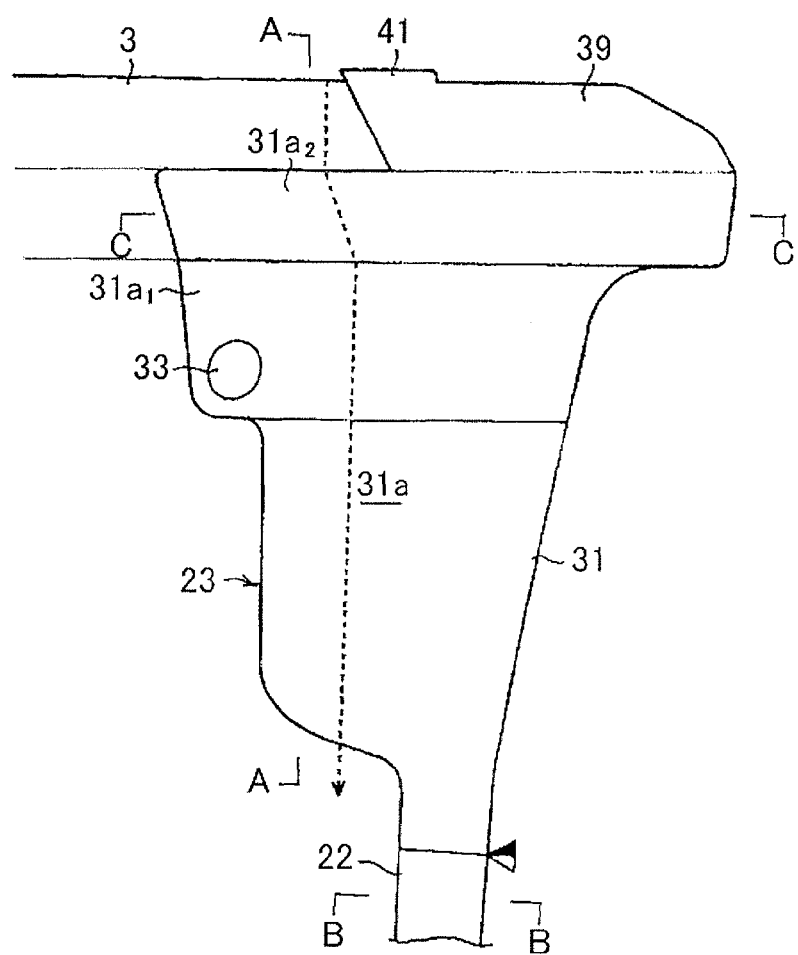
FIG. 5 is a front view of the prior art of the molded part mounted to the corner of the first-closing door viewing from the vehicle interior.
Figure 6:
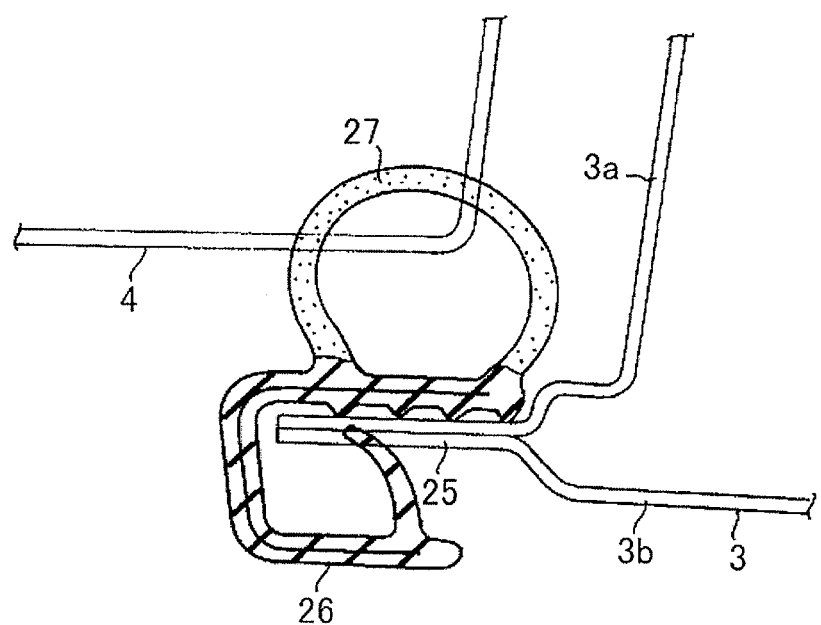
FIG. 6 is an enlarged cross-sectional view on the B-B line in FIG. 5.
Figure 7:
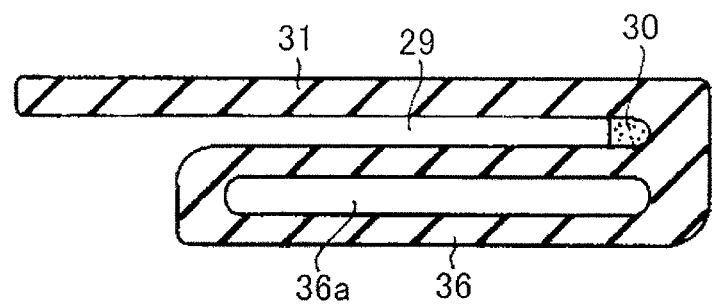
FIG. 7 is an enlarged cross-sectional view on the C-C line in FIG. 5.
Figure 8:
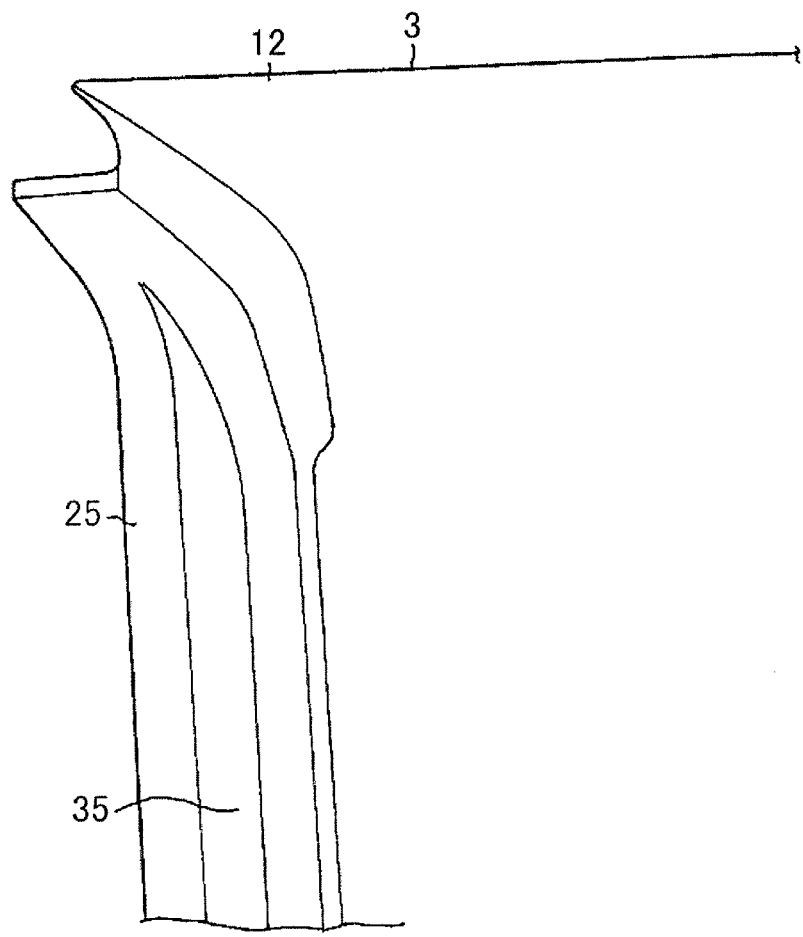
FIG. 8 is a perspective view of the corner part of the first-closing door where the molded part is mounted.
Figure 9:
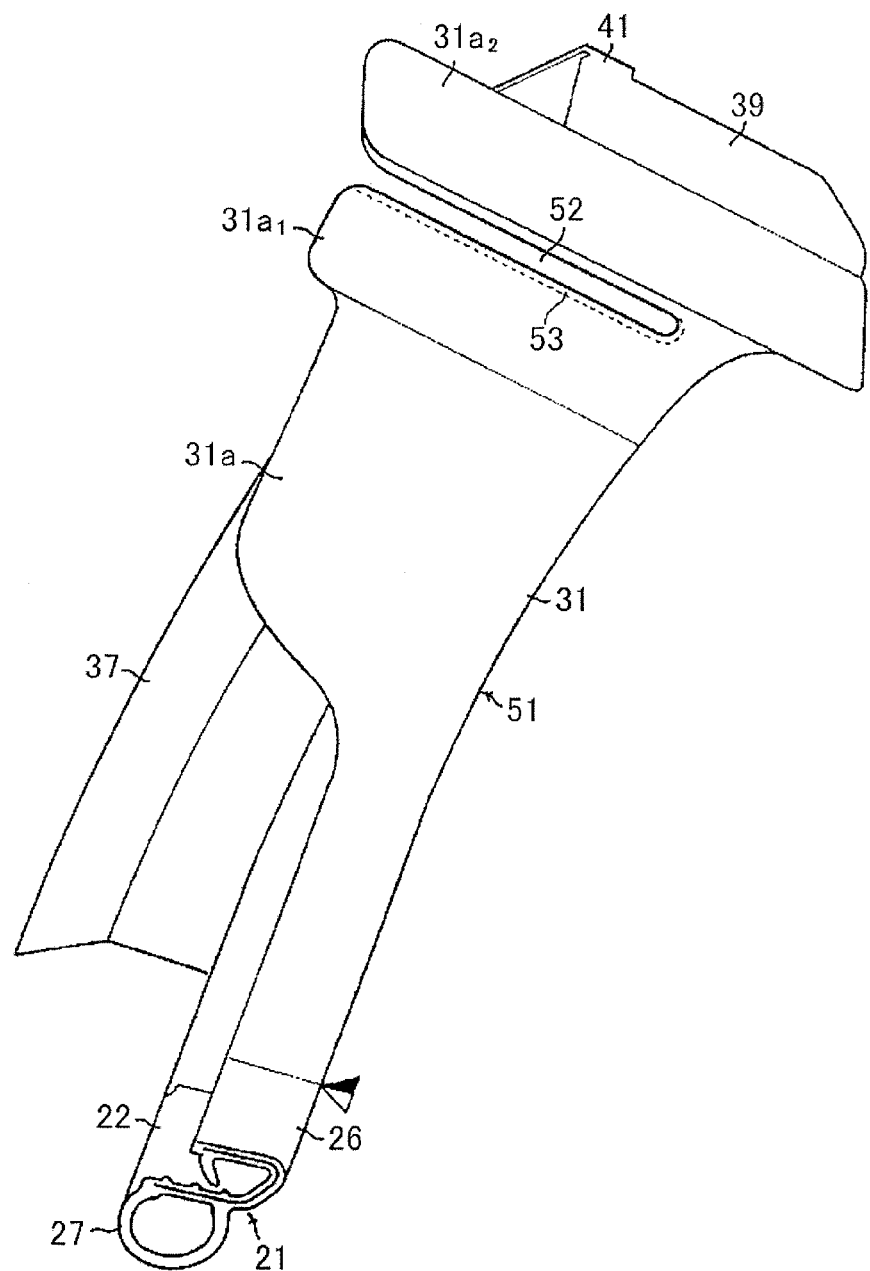
FIG. 9 is a perspective view of the molded part in the door weatherstrip relating to the present invention.
Figure 10:
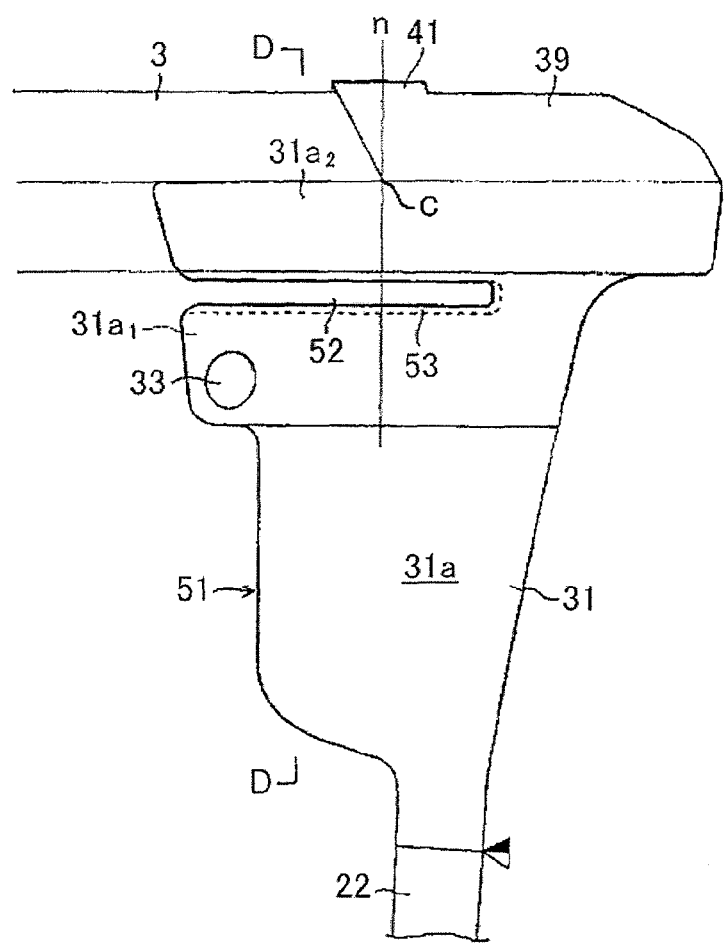
FIG. 10 is a front view of the molded part mounted in the corner of the first-closing door shown in FIG. 9 viewing from the vehicle interior side.
Figure 11:
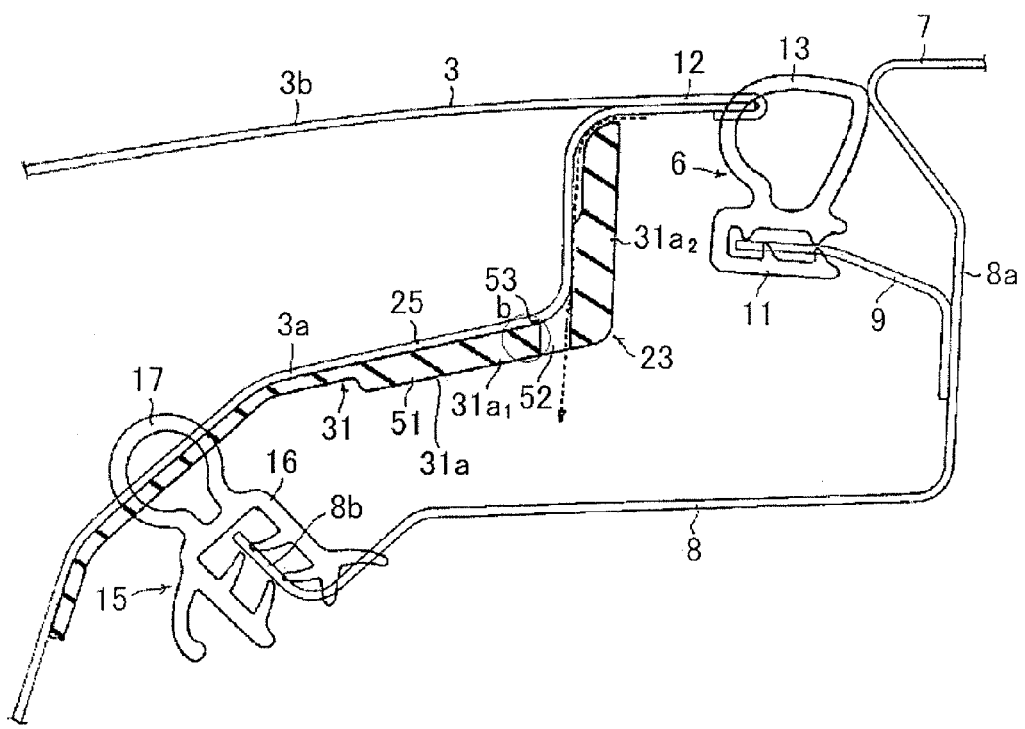
FIG. 11 is a cross-sectional view in the section equivalent to the E-E line in FIG. 1, and is a cross-sectional view on the D-D line in FIG. 10.
Figure 12:
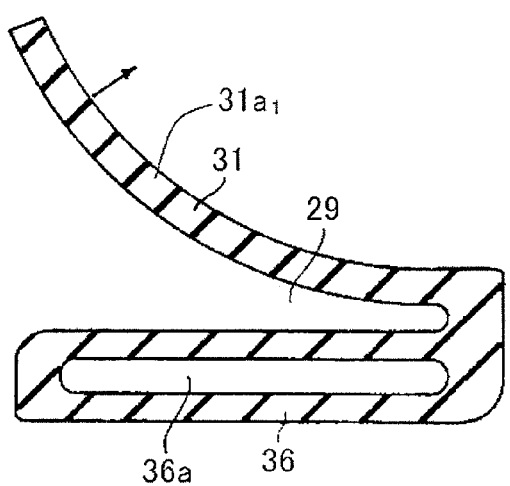
FIG. 12 shows a state where the transverse part is opened.

FIG. 9 is a perspective view of the overall structure of a molded part 51 in the door weatherstrip as similar to FIG. 3; FIG. 10 is a front view of the molded part 51 in the door weatherstrip mounted to the right door 3 viewing from the vehicle interior as similar to FIG. 5; FIG. 11 is a cross-sectional view in a section equivalent to the E-E line in FIG. 1, and is a cross-sectional view on the D-D line in FIG. 10; and FIG. 12 shows the state where expanded the transverse part $31a_1$ of the wider part $31a$ in the sidewall 31 on the vehicle interior side constituting the insertion groove 29.

Figure 13:
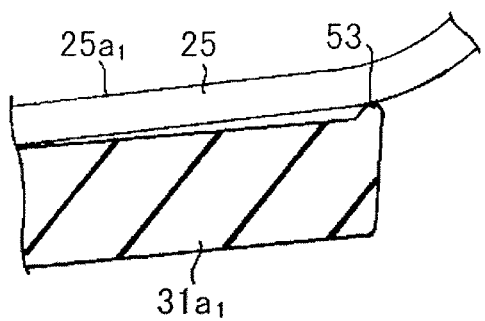
FIG. 13 is an enlarged cross-sectional view of a 'b' portion in FIG. 11.

A point where the molded part 51 of the present embodiment is different from the conventional molded part 23 shown in FIG. 2 to FIG. 7 is such that a slit 52 is formed from the side end of the wider part 31a to the vicinity of the bottom of the insertion groove 29 in the door width direction in a section where the longitudinal part $31a_2$ of the wider part $31a$ makes contact with the transverse part $31a_1$. Also, in the end surface of the transverse part $31a_1$ on the downstream side (right end surface of the transverse part $31a_1$ shown in FIG. 11), out of the end surface of the transverse part $31a_1$ and the end surface of the longitudinal part $31a_2$ constituting the slit 51, the protrusion 53 that faces the end surface and elastically makes contact with the flange 25 as shown in FIG. 13, and stops water toward the downstream side is formed along the slit 52 to the slit bottom. Herein, it is necessary to form the slit 52 by protruding from a perpendicular line 'n' that passes through a point 'c' where the upper end of the longitudinal part $31a_2$ and the tilted side end of the fin 39 are crossed toward the mating portion of the door 3 and the door 4 (right side of the perpendicular line 'n' shown in FIG. 10). With this design, water that has invaded between the longitudinal part $31a_2$ on the left side of FIG. 10 and the flange 25 can assuredly flow out from the point 'b' onto the drip channel 8.

Figure 2:
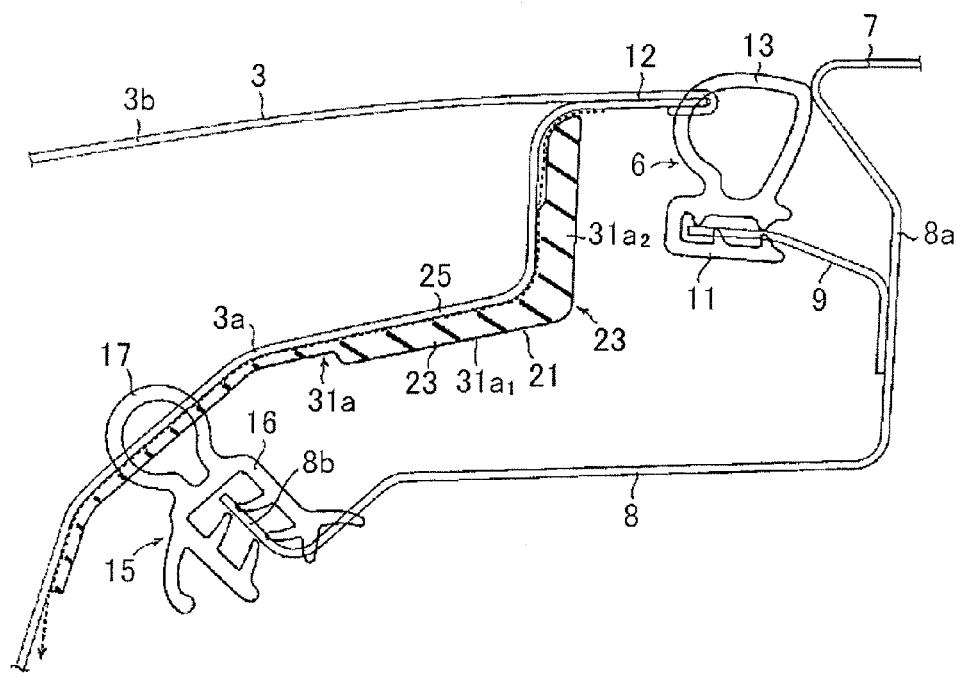
FIG. 2 is a cross-sectional view on the E-E line in FIG. 1 when a first-closing door is closed, and the molded part shows a cross section on the A-A line in FIG. 5.

According to the present embodiment, because the water that has invaded into between the longitudinal part $31a_2$ of the wider part $31a$ in the sidewall 31 on the vehicle interior side and the flange 25 flows out onto the drip channel 8 from the slit 52 as shown with the dotted line in FIG. 11 and the water invasion into the transverse part $31a_1$ is blocked by the protrusion 53, as shown with the arrow in FIG. 2, water is prevented from invading into the vehicle interior. Further, when the sealer 30 is poured into the insertion groove 29 of the wider part 31a, the insertion of a nozzle for pouring a sealer becomes easier by opening the transverse part $31a_1$ of the wider part 31a on the downstream side from the slit 52 in the direction shown with the arrow in FIG. 12 and expanding the opening of the insertion groove 19, and the sealer can be easily poured. After the sealer is poured, the door weatherstrip is inserted into the flange 25 of the inner panel 3a in the right door 3. Then, the side end part of the transverse part $31a_1$ of the wider part 31a, as shown in FIG. 10, is fixed to the inner panel 3a of the right door 3 by a clip 33 as a fixation means, preventing the wider part 31a from opening up after the sealer is poured. Further, because the position close to the protrusion 53 is fixed by the clip 33, the protrusion 53 can be strongly pressed to the flange 25, and invasion of water can be further prevented.

In the above embodiment, the slit 52 is formed along the side end (right side end in FIG. 11) on the flange side of the door upper end in the transverse part $31a_1$ that makes contact with the longitudinal part $31a_2$ as described above. In other words, the slit 52 is formed on the section of the transverse part $31a_1$ that makes contact with the longitudinal part $31a_2$. However, the slit 52 may be formed in the longitudinal part $31a_2$, and if water can flow out onto the drip channel, it can be formed in any position of the wider part 31a including the transverse part $31a_1$.

Although the molded part 51 described above includes the fin 39 to be allocated to the flange 12 from the vehicle interior side and the cover 41 that covers the side end of the flange 12 (see FIG. 9 and FIG. 10), the fin 39 and cover 41 are not essential, and they can be omitted. Further, the sidewall 31 of the molded part 51 on the vehicle interior side forms a step and the transverse part $31a_1$ and the longitudinal part $31a_2$ are formed to be thicker, but the wider part 31a may be the same width entirely, and the thickness may be the same.

The slit 52 illustrated in the above embodiment has constant groove width, but it can be formed by expanding or reducing the open side of the slit 52.

The slit 52 may be established as mentioned below.

Figure 14:
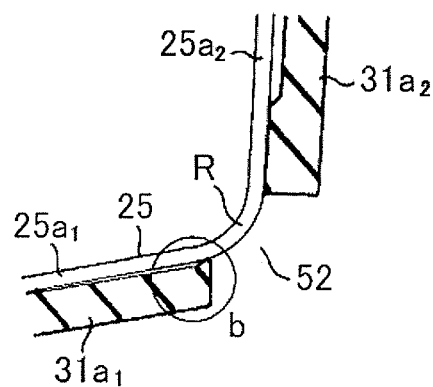
FIG. 14 is a cross-sectional view of a wider part including a slit in another mode.
Figure 15:
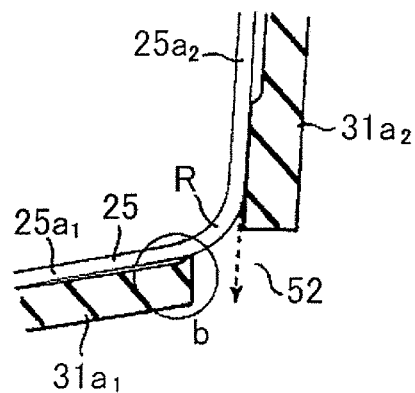
FIG. 15 is a cross-sectional view of the wider part including a slit in another mode.

FIG. 14 shows another example where the slit 52 is formed on the bend section R of the flange 25 including a transverse part $25a_1$ and a longitudinal part $25a_2$ that bends upward from the transverse part $25a_1$. When the slit 52 is formed in a section corresponding to the bend section R, the lower end of the longitudinal part $25a_2$ may be positioned upward from the bend section R as shown in FIG. 14, but it is desirable to protrude downward and away from the bend section R as shown in FIG. 15. Similar to the embodiment shown in FIG. 10, water that has invaded between the flange 25 and the longitudinal part $25a_2$, as shown with the arrow in FIG. 15, assuredly flows out to the drip channel 8 not via the bend section R of the flange 25 but via the longitudinal part $25a_2$.

The molded part 23 described above shows the clip 33 as a fixation means to fix the transverse part $31a_1$ to the inner panel 3a, but a double-faced tape or a known optional fixation means is usable.

The present invention shows the door weatherstrip mounted to the rear doors in the double door in the embodiment above, but a door weatherstrip with a similar structure can be mounted to side doors where front doors or rear doors form double doors.

The present examples and embodiments are to be considered as illustrative and not restrictive, and the invention is not to be limited to the details given herein, but may be modified within the scope and equivalence of the appended claims.

What is claimed is:

1. A door weatherstrip for a vehicle having a set of double doors, the weatherstrip comprising an extrusion part configured to mount by insertion onto a flange formed on a first-closing door of the set of double doors and a molded part integrally formed on an upper end of the extrusion part and seals between the first-closing door and a second-closing door of the set of double doors when the first and second-closing doors are closed; wherein the extruded part has a mounting base with an interior sidewall having a first width, the molded part having an interior sidewall having a second width greater than the first width of the interior sidewall of the extruded part mounting base and the interior sidewall of the molded part contains an elongated slit that extends horizontally along a face and through a terminal edge of the molded part for allowing water that has entered between the flange and the molded part to flow out onto a drip channel.

2. The door weatherstrip for a vehicle according to claim 1, wherein the molded part interior sidewall comprises a transverse part and a longitudinal part for attachment to the flange, the flange having a transverse part and a longitudinal part that extends upward from the flange transverse part via a bend section and the slit is formed in a section which is situated between the sidewall transverse part and the sidewall longitudinal part, and which corresponds to the bend section.

3. The door weatherstrip for a vehicle according to claim 2, wherein a lower end of the sidewall longitudinal part forming the slit along with an end of the sidewall transverse part protrudes downwardly away from the bend section.

4. The door weatherstrip for a vehicle according to claim 2, wherein the slit is formed where the sidewall transverse part makes contact with the sidewall longitudinal part.

5. The door weatherstrip for a vehicle according claim 1, wherein a protrusion that blocks water to a downstream side by elastically making contact with the flange is formed along the slit in the interior sidewall.

6. The door weatherstrip for a vehicle according to claim 1, wherein the interior sidewall where the slit is formed is fixed to the first-closing door by a fixation means after a sealer is poured into an insertion groove.

* * * * *